July 5, 1932.  A. A. LOCKE  1,865,575

APPARATUS FOR MANUFACTURING INTEGRAL FINNED TUBING

Filed Nov. 30, 1928  2 Sheets-Sheet 1

INVENTOR
Arthur A. Locke
BY
ATTORNEYS

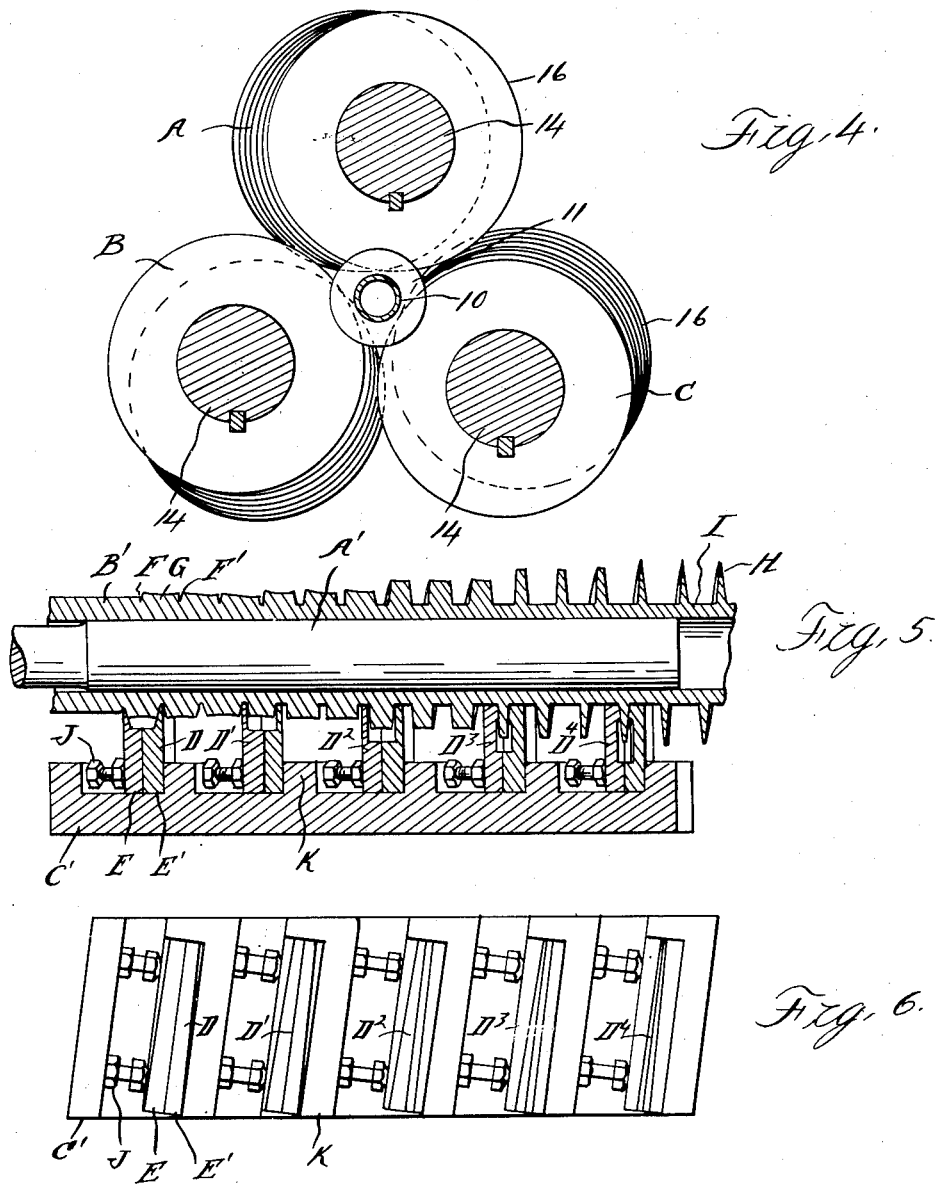

Patented July 5, 1932

1,865,575

UNITED STATES PATENT OFFICE

ARTHUR A. LOCKE, OF DETROIT, MICHIGAN, ASSIGNOR TO WOLVERINE TUBE COMPANY, OF DETROIT, MICHIGAN, A CORPORATION OF MICHIGAN

APPARATUS FOR MANUFACTURING INTEGRAL FINNED TUBING

Application filed November 30, 1928. Serial No. 322,914.

This invention relates to an apparatus for manufacturing finned tubing such as is used for automobile radiators and various other structures designed for rapid heat exchange. This application constitutes in part a division of my co-pending application Serial No. 237,930, filed December 5, 1927.

Heretofore it has been quite generally the practice in this art to form finned tubing by securing the fins to the tube for instance, by soldering. This method interposes a film of solder in the path of the heat flow and inasmuch as the thermo-conductivity of the soldering is less than that of the metal of the tube and fin, the efficiency is diminished. Also integral fin tubes have been formed by casting methods. Obviously finned tubing formed in this manner can only be made in relatively large sizes and with a considerable increase in weight.

It is therefore an important object of this invention to provide an apparatus for producing finned tubing in which the fins are integral with the walls of the tube and which can be made in all sizes.

Another object of this invention is to provide an apparatus of this character which is simple in construction and operation and which may be operated economically and efficiently.

The invention also numbers among its objects to simplify, render more efficient, and improve generally devices of this character.

The several objects, advantages and novel details of this construction will be made more apparent as this description proceeds, especially when considered in connection with the accompanying drawings, wherein:

Figure 4 is a transverse sectional view through the apparatus taken substantially on the plane indicated by line 4—4 in Figure 2.

Figure 5 is a longitudinal sectional view through a modified form of apparatus, and Figure 6 is a plan view of the form of apparatus illustrated in Figure 5.

Figure 1:
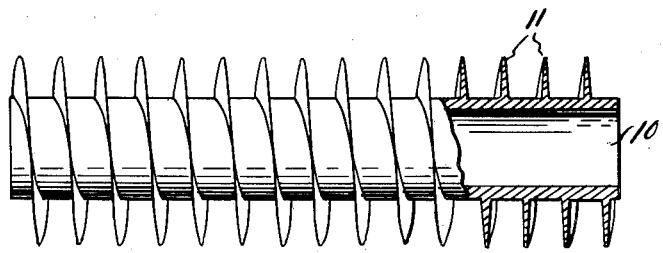
Figure 1 is a side elevation of the spirally finned tube of my improved construction, a portion being shown in longitudinal section.

By referring to Figure 1, of the drawings, it will be noted that the problem involved is that of producing a tube 10 having integral fins 11 arranged spirally of the tube and preferably having a cross-section which is largest at the point where it merges into the tube and gradually diminishes from that point to the periphery.

Figure 2:
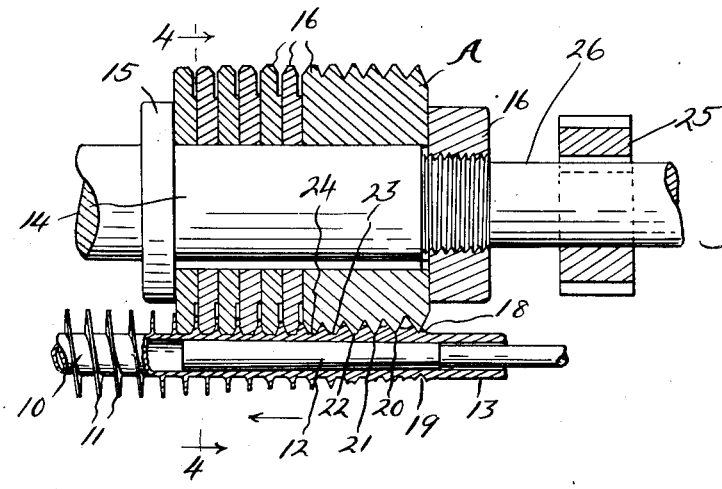
Figure 2 is a fragmentary longitudinal sectional elevation through one form of my improved apparatus for forming the fins.
Figure 3:
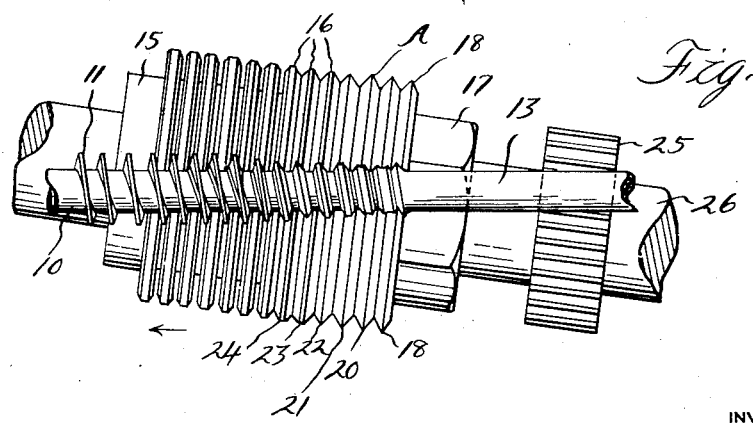
Figure 3 is a fragmentary elevational view of the apparatus.

By referring to Figures 2, 3 and 4, one form of apparatus for producing the finned tube illustrated in Figure 1 will be described. The reference character 12 indicates a mandrel forming a support for a portion of a tube 13 which is longitudinally fed in the direction indicated by the arrow. The forming mechanism consists of three rolls indicated generally by the reference characters A, B, and C distributed radially around the mandrel over which the tube 13 is fed. Each roll is so fashioned as to first form a V-shape spiral groove in the wall of the tube and to subsequently progressively compress the metal between the adjacent grooves axially of the tube so as to reduce the thickness and increase the radial dimension thereof.

Each of the rolls, A, B, and C, consists of a core or body portion 14 having adjacent one end thereof a shoulder 15 constituting an abutment and mounted upon the core 14 is a plurality of die members 16. These die members may be conveniently secured in place upon the body 14 by means of a clamping nut or the like 17, which will clamp the die members against the shoulder 15. The first die member to the right, as viewed in Figure 2, is provided with a substantially knife edge 18 which forms the initial groove 19 in the wall of the tube.

The succeeding portions 20, 21, 22, 23 and 24 of this die member are adapted to compress, in the direction of the axis of the tube, the metal between successive convolutions of the spiral groove 19. This successive squeezing action effected successively between die members 16 reduces the metal between the convolutions of the groove and forces the fin radially outwardly until it finally produces the finished fin 11. The design of the die members is such that the finished fin 11 is wider at the point of integral attachment to the tube and tapers to a substantially knife edge at its periphery. The axis of each of the forming rolls is arranged at an angle to the axis of the tube corresponding to the pitch of the helix as indicated most clearly in Figures 3 and 4.

The forming rolls A, B, and C, are preferably positively rotated and while any preferred or desired means for rotating these rolls may be provided, I have herein illustrated such driving means as consisting of pinions 25 mounted upon the shaft 26 of each forming member, these pinions 25 being driven in synchronism by gearing (not shown). The rotation of the forming rolls A, B, and C, causes the tube to be fed in the direction of the arrow in Figure 2.

The form of construction illustrated in Figures 5 and 6 differs slightly from the previously described form of construction but the result produced is substantially identical. As shown in these fingers A′ is a mandrel forming a support for a portion of a tube B′ which is revolved thereon and progressively fed forward in the direction of its axis. C′ is a stationary frame adjacent to the mandrel providing a mounting for a series of dies or forming tools D, D′, D², D³, D⁴ etc. Each of these dies comprises a pair of members E, E′, having spaced pressure surfaces extending transversely of the axis of the tube at an angle corresponding to the pitch of the helix. The die member D has its portions E, E′, with substantially knife edge entering portions which cut the initial grooves F, F′ in the wall of the tube B. The surfaces of these portions E, E′ are non parallel and are slightly converging in the forward direction of rotation of the tube so as to produce a wedge for squeezing the metal G between the grooves to decrease the width thereof. The succeeding dies D′, D² etc. continue the squeezing action for reducing the metal between convolutions of the grooves and these dies are so positioned as to come successively into action in the spiral advance of the tube. Thus the metal between convolutions is gradually forced radially outward until it finally produces the finished fin H which is wider at the point of integral attachment to the tube and tapers to a substantial knife edge. This same action reduces the thickness of the wall of the tube as indicated at I.

The die plates E, E′ are preferably separate from the member C′ and are attached thereto by suitable means such as clamping screws J which press each pair of dies against a rib or shoulder K on the base.

The tube B′ can be rotated by any preferred or desired means (not shown) and the rotation of the tube in engagement with the forming tools causes the tube to be progressively fed forward in the direction of its axis.

While two forms of the invention have been described herein somewhat in detail, it will be readily apparent that the specific constructions herein illustrated may be modified in many of the essential and all of the non-essential details thereof, and to this end reservation is made to make such changes as may come within the purview of the accompanying claims.

What I claim as my invention is:

1. An apparatus for forming finned tubing comprising means for supporting a plain tube, a series of dies intersecting the outer cross section of said tube, means for relatively rotating said tube and dies and simultaneously axially feeding one with respect to the other to provide negative rib profiles of successively decreasing width which groove the outer surface of said tube, said dies being fashioned to progressively squeeze the metal between the grooves to reduce the thickness and increase the radial dimension thereof.

2. An apparatus for forming finned tubing comprising means for mounting a plain tube and die means having work engaging projections and cavities for axially compressing portions of the outer surface of the wall of the tube and to radially outwardly deflect the said portions.

3. An apparatus for forming finned tubing comprising means for supporting a plain tube, means for initially forming spaced grooves in the outer surface of the wall of the tube, and die means for progressively compressing the metal between said grooves to reduce the thickness thereof and to increase the radial dimension.

4. An apparatus for forming finned tubing comprising means for supporting a plain tube, means for initially forming spaced grooves in the outer surface of the wall of the tube and means including work engaging projections for subsequently progressively compressing the metal between said grooves axially of the tube to reduce the thickness and increase the radial dimension thereof.

5. An apparatus for forming helical finned tubing, comprising means for supporting a plain tube, means for initially forming a helical groove in the outer periphery of the tube, and die means including work engaging portions for subsequently compressing the metal between successive convolutions of the helical groove to reduce the thickness and increase the radial dimension thereof.

6. An apparatus for forming finned tubing comprising means for supporting a plain tube, a plurality of forming rolls each comprising a series of dies arranged in positions for intersecting the cross-section of said tube, means for rotating said forming rolls and simultaneously axially feeding said tube to helically groove the outer surface of said tube, said dies being fashioned to provide negative rib profiles of successively decreasing with and successively increasing depth which progressively squeeze the metal between the convolutions of the helical groove to reduce the thickness and increase the radial dimension thereof.

7. An apparatus for forming helical finned tubing comprising means for supporting a plain tube, a plurality of forming rolls each comprising a series of dies which intersect the outer cross-section of said tube, means for relatively rotating said tube and forming rolls and simultaneously axially feeding one with respect to the other, each forming tool comprising means for initially forming a helical groove in the outer periphery of the tube and for subsequently progressively squeezing the metal between the convolutions of the helical groove to reduce the thickness and increase the radial dimension thereof.

In testimony whereof I affix my signature.

ARTHUR A. LOCKE.